United States Patent
Russell et al.

(10) Patent No.: US 8,915,118 B2
(45) Date of Patent: *Dec. 23, 2014

(54) IMPACT DETECTION SYSTEM

(75) Inventors: Brian Keith Russell, Crownsville, MD (US); Paul Benjamin Mallinson, Auckland (NZ); Stephen Christopher Kent, Auckland (NZ); Christopher Michael Solomon, Auckland (NZ)

(73) Assignee: Covidien LP, Mansfield, MA (US)

( * ) Notice: Subject to any disclaimer, the term of this patent is extended or adjusted under 35 U.S.C. 154(b) by 199 days.

This patent is subject to a terminal disclaimer.

(21) Appl. No.: 13/291,429

(22) Filed: Nov. 8, 2011

(65) Prior Publication Data

US 2012/0144934 A1 Jun. 14, 2012

Related U.S. Application Data

(63) Continuation of application No. 12/448,012, filed as application No. PCT/NZ2007/000208 on Aug. 7, 2007, now Pat. No. 8,079,247.

(30) Foreign Application Priority Data

Dec. 4, 2006 (NZ) ........................ 551819

(51) Int. Cl.
| | |
|---|---|
| *G01M 7/00* | (2006.01) |
| *F41J 5/056* | (2006.01) |
| *A41H 1/02* | (2006.01) |
| *A42B 3/04* | (2006.01) |
| *G01P 15/08* | (2006.01) |
| *G01P 15/125* | (2006.01) |
| *G01L 5/00* | (2006.01) |
| *G01P 1/12* | (2006.01) |

(52) U.S. Cl.
CPC ............... *G01L 5/0052* (2013.01); *F41J 5/056* (2013.01); *A41H 1/02* (2013.01); *A42B 3/046* (2013.01); *G01P 15/0891* (2013.01); *G01P 15/125* (2013.01); *G01P 1/127* (2013.01)
USPC ........................................................ 73/12.01

(58) Field of Classification Search
USPC ............................................ 73/12.01–12.14
See application file for complete search history.

(56) References Cited

U.S. PATENT DOCUMENTS

| | | | |
|---|---|---|---|
| 5,636,378 | A | 6/1997 | Griffith |
| 6,216,546 | B1 | 4/2001 | Bahr |

(Continued)

FOREIGN PATENT DOCUMENTS

| | | |
|---|---|---|
| EP | 1698875 | 9/2006 |
| GB | 2329243 | 3/1999 |
| WO | 9009218 | 8/1990 |
| WO | 0240756 A2 | 5/2002 |

*Primary Examiner* — Max Noori

(57) ABSTRACT

A garment may be used for detecting an impact. The garment may include a capacitive compression sensor attached to the garment having an inner and outer layer of conductive material as well as a compressible non-conductive material between the inner and outer layers. The outer layer of conductive material may include an electrical isolation region. The garment may further include an impact detection device electrically connected to the capacitive compression sensor via a conductor that traverses the electrical isolation region. The impact detection device may include a processing circuit configured to process a change in a capacitance of the capacitive compression sensor into a digital format representative of the impact. The outer layer of conductive material may enclose the inner layer of conductive material.

20 Claims, 4 Drawing Sheets

(56) References Cited

U.S. PATENT DOCUMENTS

| | | |
|---|---|---|
| 6,308,578 B1 | 10/2001 | DeRose |
| 6,925,851 B2 * | 8/2005 | Reinbold et al. ............. 73/12.09 |
| 7,384,380 B2 * | 6/2008 | Reinbold et al. ............... 482/91 |
| 7,526,389 B2 * | 4/2009 | Greenwald et al. ............. 702/55 |
| 7,559,902 B2 | 7/2009 | Ting et al. |
| 2005/0275416 A1 | 12/2005 | Hervieux et al. |
| 2008/0189827 A1 | 8/2008 | Bauer |

* cited by examiner

IMPACT DETECTION SYSTEM

CROSS-REFERENCE TO RELATED APPLICATIONS

This application is a continuation of, and claims priority to, U.S. patent application Ser. No. 12/448,012, filed Nov. 5, 2009 now U.S. Pat. No. 8,079,247, which claims priority to PCT/NZ2007/000208 filed Aug. 7, 2007, which claims priority to New Zealand No. 551819 filed Dec. 4, 2006, all of which are incorporated herein by reference in their entirety for all purposes.

FIELD OF INVENTION

The present invention relates to an impact detection system. In particular, although not exclusively, the impact detection system is capable of measuring a number of ballistic or non-ballistic type features, such as absorption energy for example, as a result of an impact on a body.

BACKGROUND TO THE INVENTION

A number of systems have been used in the past to detect and/or monitor the effects of an impact from an object, for example a projectile on a body. In a laboratory environment plastina clay has typically been used when trialling or testing the ballistic type effects of an impact from a projectile, such as a bullet for example, on a body whereby the plastina clay simulates body composition. Using this type of system it is not possible to measure the actual back face velocity of an armour plate for example that is placed in front of the plastina clay. Therefore, measurements relating to the impact of the projectile on the body are inferred by indirect methods as a result of an analysis undertaken on deformation of the plastina clay.

Detecting the penetration of impacts on a body may also be measured by using a mesh fabric incorporating fibre optics placed on armour worn by a user. When a fibre is broken, it is assumed to be caused by a penetrating impact. However, this type of system is generally very fragile and cannot be used to accurately determine a ballistic impact from a rip or tear in the armour fabric caused by other sources.

Other ballistic impact detection systems incorporate peizo electric film sensor elements attached to body armour for example. The peizo film sensors detect acoustic vibration patterns caused by impacts and convert them into a voltage. The voltage is passed through a circuit which determines if the impact has the frequency and amplitude characteristics that have become associated with typical impacts that cause injuries. The voltage output from the peizo film sensors feed a battery powered analogue or digit circuit which has to be carried by the user or combatant. The circuitry is used to isolate the high energy acoustic signatures produced by ballistic impacts and discerns the approximate impact location on the body. This type of system requires a considerable amount of signal processing and filtering of the acoustic signatures in order to discriminate impact signature information from noise for example in order to provide useable impact data output.

There is therefore a need for an impact detection system for detecting and monitoring the effects of impacts on a body and in particular but not exclusively, impacts that might cause injury.

In this specification if reference has been made to patent specifications, other external documents, or other sources of information, this is generally for the purpose of providing a context for discussing the features of the invention. Unless it is specifically stated otherwise, reference to such external documents is not to be construed as an admission that such documents, or such sources of information, in any jurisdiction, are prior art or form part of the common general knowledge in the art.

It is an object of the present invention to provide improved impact detection system for detecting and measuring impact related characteristics on a body, or at least to provide industry or the public with a useful choice.

SUMMARY OF THE INVENTION

In a first aspect, the present invention consists in an impact detection system for detecting and measuring impact related characteristics on a body comprising:
  an impact surface,
  at least one fabric compression sensor having an electrical characteristic attached to or integral with said impact surface and adapted to detect an impact event on said body, and
  an impact detection device electrically connected to said at least one fabric compression sensor, said impact detection device including:
    a detection circuit for detecting changes in said electrical characteristic produced due to an impact on said impact surface;
    a processing circuit for processing said detected changes in said electrical characteristic into a digital data format representative of an impact characteristic on said impact surface.

Preferably, said impact detection device also includes a user interface for outputting said digital data to a visual and/or audible output device for analysis and/or review by an individual.

Preferably, said impact detection device also includes a storage device for storing said digital data and a communication system for communicating said digital data to a third party system for analysis and/or storage of said digital data.

Preferably, said impact detection system is a portable lightweight device.

Preferably, said impact detection device is activated when an impact event is detected on said impact surface.

Preferably said impact related characteristics on said body include a ballistic impact or a non-ballistic impact.

Preferably, said impact surface is segmented to provide a plurality of detection zones wherein each of said plurality of detection zones has at least one fabric compression sensor attached to, integral with, located behind or in front of said impact surface and electrically connected to said impact detection device.

Preferably, said at least one fabric compression sensor is used to detect said impact event caused by an externally applied force on said impact surface.

Preferably, said impact detection device is driven by an AC signal having a high output resistance.

Preferably, said at least one fabric compression sensor is a capacitive fabric compression sensor formed by at least two layers of conductive fabric having a compressible non-conductive material between each of said layers of conductive fabric.

Preferably, said compressible non-conductive material deforms or compresses when said impact surface is deformed due to said impact event.

Preferably, said at least one fabric compression sensor includes an inner conductive layer surrounded by an outer conductive fabric layer separated by a layer of said compressible non-conductive material.

Preferably, said outer conductive layer is coupled to an AC ground within said impact detection device and said inner conductive layer is coupled to said AC signal having a high output resistance such that said fabric compression sensor has output characteristics equivalent to those provided by a variable capacitor.

Preferably, said impact event causes said AC signal to change in amplitude due to a change in a capacitive coupling between said inner conductive layer and said outer conductive layer.

Preferably, said change in capacitive coupling is caused by a change in a separation distance between said inner conductive layer and said outer conductive layer due to said compressible non-conductive layer being deformed and/or compressed as a result of said impact event.

Preferably, said processing circuit samples the amplitude of said AC signal to generate a digital impact event related waveform and data representative of said impact event for storage in said storage device within said impact detection device and/or for output to a third party system.

Preferably, said inner conductive layer is formed from a stretchable and flexible fabric material.

Alternatively, said inner conductive layer is formed from a metallised cloth.

Alternatively, said inner conductive layer is formed from a metallic material

Preferably, said outer conductive layer is formed from a stretchable and flexible fabric material.

Alternatively, said outer conductive layer is formed from a metallised cloth.

Alternatively, said outer conductive layer is formed from a metallic material.

Preferably, said compressible non-conductive layer is formed from a closed cell foam type of material.

Preferably, said impact surface is selectable from the list comprising: a bullet proof vest, helmet, clothing, body armour, ceramic armour, an individual's body, a body harness or strap and composite surfaces.

Preferably, said impact surface is capable of incorporating at least one or more alternative type of sensor including any one or more selected from a list comprising: a pressure sensor, temperature sensor, heart rate sensor, respiration sensor, direction sensor or movement sensor.

Preferably, said communications system includes a communications port.

Alternatively, said communications system includes a wireless transmitter.

Preferably, said communications port provides a user interface between said third party system and said impact detection device enabling a user to use said third party system to download said digital impact related data from said impact detection device to said third party system.

Alternatively, said wireless transmitter provides a user interface between said third party system and said impact detection device enabling a user to use said third party system to download said digital impact related data from said impact detection device to said third party system.

Preferably, said at least one fabric compression sensor is integral said impact surface.

Preferably, said electrical connection is made by at least one conductive thread.

Preferably, said impact detection device is a low power battery driven device.

In a second aspect the present invention consists in garment worn by a user and used to detect and measure the effects of an impact on a user comprising:
- at least one fabric compression sensor integral with said garment,
- an impact detection device electrically connected to said at least one fabric compression sensor, and
- a detecting circuit capable of detecting changes in said electrical characteristic caused by an impact event on said garment, said impact detection device including:
  - a processing circuit for processing the changes in said electrical characteristic into a digital data format representative of an impact characteristic on said garment.

Preferably, said impact detection device includes a user interface for outputting said digital data to a visual and/or audible output device for analysis and/or review by an individual.

Preferably, said impact detection device also includes a storage device for storing said digital data, and a communication system for communicating said digital data to a third party system for analysis and/or storage of said digital data.

Preferably, said impact detection device is a portable lightweight device.

Preferably, said impact detection device is activated when an impact event is detected on said garment.

Preferably, said impact related characteristics on said user include a ballistic impact or a non-ballistic impact.

Preferably, said garment is segmented to provide a plurality of detection zones wherein each of said plurality of detection zones has at least one fabric compression sensor integral with, attached to or located in front or behind said garment and electrically connected to said impact detection device.

Preferably, said at least one fabric compression sensor is used to detect said impact event caused by an externally applied force on said garment.

Preferably, said impact detection device is driven by an AC signal having a high output resistance.

Preferably, said at least one fabric compression sensor is a capacitive fabric compression sensor formed by at least two layers of conductive fabric having a compressible non-conductive material between each of said layers of conductive fabric.

Preferably, said compressible non-conductive material deforms or compresses when said impact surface is deformed due to said impact event.

Preferably, said at least one fabric compression sensor includes an inner conductive layer surrounded by an outer conductive fabric layer separated by a layer of said compressible non-conductive material.

Preferably, said outer conductive layer is coupled to an AC ground within said impact detection device and said inner conductive layer is coupled to said AC signal having a high output resistance such that said fabric compression sensor has output characteristics equivalent to those provided by a variable capacitor.

Preferably, said impact event causes said AC signal to change in amplitude due to a change in a capacitive coupling between said inner conductive layer and said outer conductive layer.

Preferably, said change in capacitive coupling is caused by a change in a separation distance between said inner conductive layer and said outer conductive layer due to said compressible non-conductive layer being deformed and/or compressed as a result of said impact event.

Preferably, said processing circuit samples the amplitude of said AC signal to generate a digital impact event related waveform and data representative of said impact event for storage in said storage device within said impact detection device and/or for output to a third party system.

Preferably, said inner conductive layer is formed from a stretchable and flexible fabric material.

Alternatively, said inner conductive layer is formed from a metallised cloth.

Alternatively, said inner conductive layer is formed from a metallic material.

Preferably, said outer conductive layer is formed from a stretchable and flexible fabric material.

Alternatively, said outer conductive layer is formed from a metallised cloth.

Alternatively, said outer conductive layer is formed from a metallic material.

Preferably, said compressible non-conductive layer is formed from a closed cell foam type of material.

Preferably, said garment is selectable from the list comprising: a bullet proof vest, helmet, clothing, body armour, a body harness or strap and ceramic armour.

Preferably, said garment is capable of incorporating at least one or more alternative sensor types including any one or more selected from a list comprising: a pressure sensor, temperature sensor, heart rate sensor, respiration sensor, direction sensor or movement sensor.

Preferably, said communications system includes a communications port.

Alternatively, said communications system includes a wireless transmitter.

Preferably, said communications port provides a user interface between said third party system and said impact detection device enabling a user to use said third party system to download said digital impact related data from said impact detection device to said third party system.

Alternatively, said wireless transmitter provides a user interface between said third party system and said impact detection device enabling a user to use said third party system to download said digital impact related data from said impact detection device to said third party system.

Preferably, said electrical connection is made by at least one conductive thread.

Preferably, said impact detection device is a low power battery driven device.

In a third aspect, the present invention consists in a method of detecting and measuring impact related characteristic on a body using an impact detection device comprising:
  at least one fabric compression sensor having an electrical characteristic, and
  an impact detection circuit electrically connecting said at least one fabric compression sensor, said method comprising the steps of:
    activating said impact detection circuit on detecting a change in said electrical characteristic caused by an impact on said body,
    processing said changes in said electrical characteristic into a digital data format representative of an impact type characteristic on said body. And
    storing said digital data in a storage device within said impact detection device, and communicating said digital data to a third party system for analysis and/or storage of said digital data Preferably, said step of processing said changes in said electrical characteristic further includes the steps of outputting said digital data to a visual and/or audio device via a user interface.

Preferably, said step of processing said changes in said electrical characteristic includes measuring changes in a capacitive coupling of said least one fabric compression sensor as a result of an impact on said body by an externally applied force.

Preferably, said step of communicating includes sending said digital data from said storage device to said third party system via a communications port.

Preferably, said step of communicating includes transmitting said digital data from said storage device to said third party system via a wireless transmitter.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The term 'comprising' as used in this specification and claims means 'consisting at least in part of', that is to say when interpreting statements in this specification and claims which include that term, the features, prefaced by that term in each statement, all need to be present but other features can also be present.

The invention consists in the foregoing and also envisages constructions of which the following gives examples only.

BRIEF DESCRIPTION OF THE DRAWINGS

The present invention will now be described with reference to the accompanying drawings in which.

DESCRIPTION OF THE PREFERRED EMBODIMENTS OF THE INVENTION

The detection and measurement of ballistic and/or non-ballistic impacts on a soldier's body for example would prove invaluable in the ability to increase the survivability of a soldier in a battle field situation. As an example, an impact detection system may facilitate a more rapid response by medics depending on the output generated from the detection system worn by a soldier as a result of an impact being detected.

The impact detection system of the present invention can be used on various types of impact surfaces such as body armour including a bullet proof vest, battle fatigues, a uniform, a body harness or strap, helmet or other garments designed for the body including underwear. Alternatively, the system can be used to detect impacts on other types of composite materials such as those found on an aircraft fuselage, boat hull or armour on a tank for example. These impacts can be of a ballistic or non-ballistic nature. The system provides a means of sensing, monitoring and recording impact events on an impact surface using at least one sensor that is incorporated into the impact surface. Alternatively, the sensor(s) are attached to, integral with, or can be located behind or in front of the impact surface. Furthermore, the sensor(s) can be integral with patches used to adhere to the user's body in desires positions. The impact detection system is capable of detecting an impact(s) on a body and enabling a number of ballistic type features such as back face velocity, impact force and absorption energy to be determined and analysed for example. Whilst a number of measured ballistics type features have been mentioned these are in no way limiting as the sensing system can be used in a wide variety of environments and for a wide variety of purposes including non-ballistic type impacts.

Capacitive Fabric Compression Sensors

Figure 1:
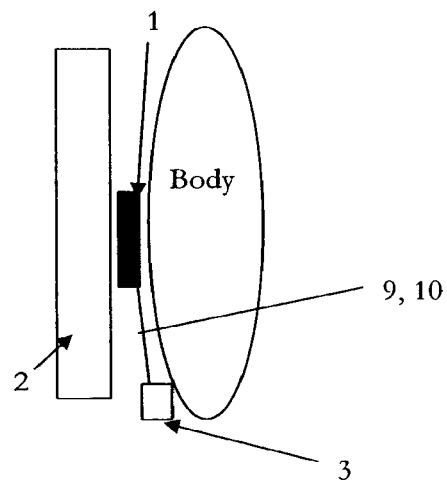
FIG. 1 is a diagram of the impact detection system of the present invention.

A preferred embodiment of the impact detection system of the present invention is shown in FIG. 1. A capacitive fabric compression sensor 1 is attached to, integral with or located behind or in front of an impact surface 2 such as a layer of body armour. Whilst only one capacitive compression sensor 1 is shown, a number of capacitive compression sensors (not shown) may be attached to the impact layer 2 to provide a number of detection zones each of which are electrically connected to the impact detection device 3. The capacitive compression sensor(s) 1 can be attached to the impact surface 2 using an attachment mechanism such as Velcro™ attachments, press-fit or snap-fit type attachments, compression connections such as crimping or soldering or alternatively the use of conductive adhesives and glues. Alternatively, if the impact layer 2 is a wearable garment such as battle fatigues or other form of clothing, the capacitive compression sensor(s) 1 can be integrated with the garment fabric during manufacture of the garment. An electronic impact detection device 3 is electrically connected or interfaced to the capacitive compression sensor(s) 1 via electrical connections 9, 10 such as conductive yarn or direct connection at the sensor location. As impact detection device 3 is very compact and small, it is preferable that the impact detection device 3 is portable and incorporated and worn as part of on the user's clothing. Alternatively, the impact detection device 3 can be fitted to a user's belt or enclosed within a pouch or pocket for example. This enables the impact detection device 3 to be located a short distance from the capacitive compression sensor(s) 1 and thus protecting the device 3 from potential impact damage.

Figure 2:
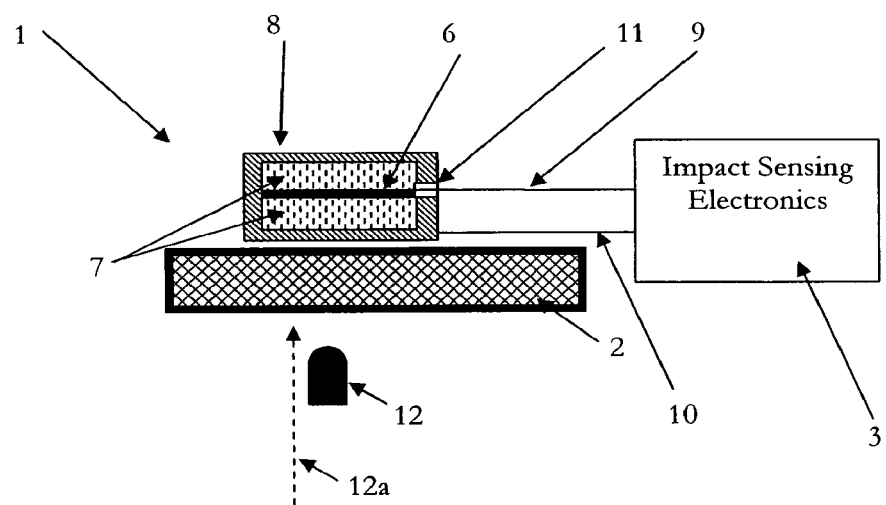
FIG. 2 is diagram of the impact detection system of FIG. 1 showing the constructions of the capacitive fabric compression sensor.

Each capacitive fabric compression sensor 1 includes an inner central layer of conductive material 6 such as metallised cloth, metallic material or a stretchable and flexible fabric material that is surrounded by a layer of deformable or compressible non-conductive layer of material 7 such as closed cell foam or other compressible material that has repeatable mechanical properties as shown in FIG. 2. The inner central layer 6 and compressible non-conductive layer 7 are then enclosed within an outer layer of conductive material 8 such as metallised cloth, metallic material or a stretchable and flexible fabric material. The inner conductive layer 6 is electrically connected by a conductive thread 9 to the impact detection device 3 to provide an impact sensing signal input to the impact detection device 3 whilst the outer conductive layer 8 is electrically connected using a conductive thread 10, to signal ground via the impact detection device 3. The outer conductive layer includes an electrical isolation region 11 that is used to provide electrical isolation between the outer conductive layer 8 and the inner conductive layer electrical connection 9 extending through the outer conductive layer wall 8.

As the outer conductive layer 8 is referenced to the electronics signal ground via conductive thread 10, this type of electrical configuration does not tend to be effected by interference such as noise external to the capacitive compression sensor(s) 1. The layered configuration of the capacitive compression sensor 1 enables the capacitance between the inner conductive layer 6 and the outer conductive layer 8 to be detected and measured by the impact detection device 3. The capacitance changes as a result of compressible non-conductive layer 7 being compressed or deformed due to an impact from a projectile 12 for example, travelling in the direction of the arrow 12a on the impact surface 2 as shown in FIG. 3.

Effects of Impact

Figure 3:
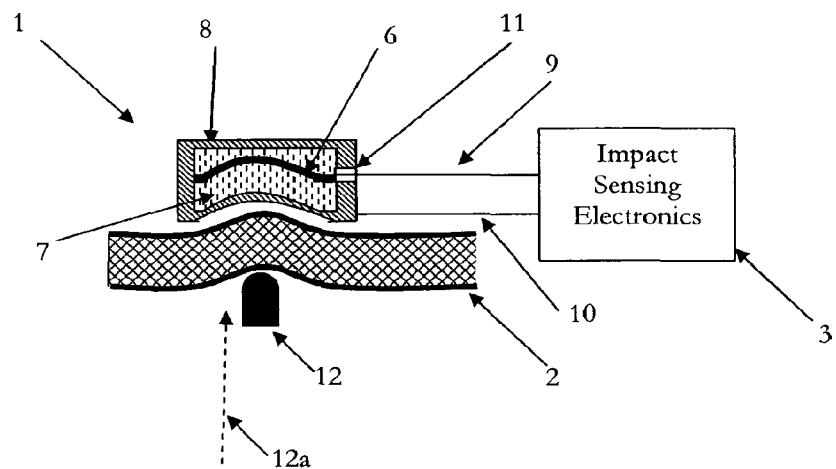
FIG. 3 is a diagram of the system of FIG. 1 showing the effects of an impact on the capacitive fabric compression sensor.

The capacitive fabric compression sensor(s) 1 is attached to an impact surface 2 such as an armoured plate as shown in FIGS. 1 to 3. A projectile 12 is fired in the direction of the arrow 12a at the impact surface 2 causing the impact surface 2 to be deformed and an indent created in the impact surface 2 as a result of the projectile 12 striking the impact surface 2 as shown in FIG. 3. The deformation or indentation of the impact surface 2 causes at least the outer conductive layer 8 of the capacitive compression sensor 1 to also deform. This causes the compressible non-conductive layer 7 to be compressed thereby reducing the spatial distance between the outer and inner conductive layers 6, 8 respectively. Therefore, due to the electrical connection 9, 10 of the inner and outer conductive layers 6, 8, the capacitance between the inner and outer layers 6, 8 changes as the compressible non-conductive layer 7 is compressed.

As the outer conductive layer 8 is conductive and referenced to electrical ground via conductive thread 10, there is little or no effect on the ability to detect capacitive changes between the two conductive layers 6, 8 as a result of outside interference on the capacitive compression sensor 1. Changes in the capacitive coupling between the inner 6 and outer 8 conductive layers can be detected and measured by the impact sensing and processing device. This data is used to determine the change in distance between each of the conductive layers 6, 8. Using the change in distance between the conductive layers 6, 8, it is possible to determine impact ballistics data such as the speed and energy of an impact from the projectile 12 for example, on the armour plate or other impact surface 2. The measurement of the energy absorbed by the impact surface 2 is of particular importance particularly when used to design and develop more effective body armour for example.

Impact Detection Device

Each capacitive fabric compression sensor(s) 1 is attached to the impact surface 2 and is electrically connected to the impact detection device 3 by one or more conductive threads 9, 10. The impact detection device 3 is a small portable device that can be discretely concealed on the user's body or within the user's clothing for example. Whilst it is preferable to interface the capacitive fabric compression sensor(s) 1 to the impact detection device 3 using conductive thread type electrical connections 9, 10, other forms of electrical connections can be made for example, standard type cable or wire. It is therefore possible to position the impact detection device 3 in a position such that it is isolated from the capacitive fabric compression sensor(s) 1 and the impact surface 2 and as such, less likely to be affected or damaged by any impacts from a projectile 12 on the impact surface 3.

The electronic impact detection device 3 is capable of collecting and outputting data to a visual display device and/or and audible device via a user interface and/or storing impact data in storage device such as memory 14 within the impact detection device 3. The stored data can be downloaded to a third party system for impact data analysis via a communications system 20 such as a communications port serial interface that is integral with the impact detection device. Alternatively, the impact detection device may incorporate a wireless transmitter that can be used to download the stored impact data to a remote third party system. Alternatively, once an impact is detected, the impact data can be transmitted in real time to a remote third party system at a remote location for analysis to be undertaken on the impact data.

Figure 4:
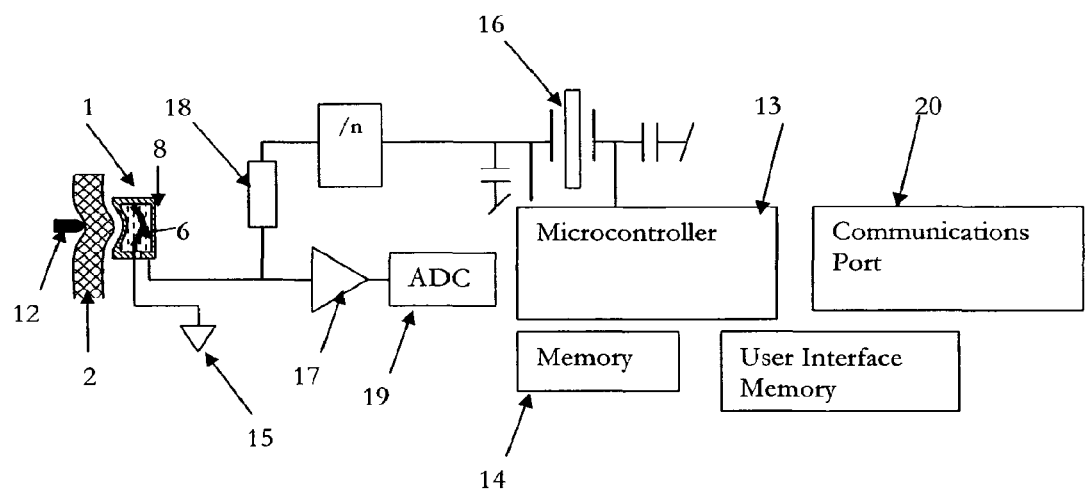
FIG. 4 is a block diagram of the electronic sensing system of FIG. 1.

The impact detection device 3 is shown in FIG. 4 and is only triggered as a result of an impact event being detected. That is, when the distance between the inner and outer conductive layers 6, 8 changes due to the non-conductive layer 7 being deformed or compressed thereby changing the capacitance between the inner and outer conductive layers 6, 8. In effect, the fabric compression sensor 1 acts like a variable capacitor when an impact event occurs. Similarly, no data is stored in the device memory 14 until an impact is detected. This enables the processor 13 within the impact detection device 3 to perform high speed sampling tasks relative to the processing power of the device 3 as well as minimise power consumption of the impact detection device 3. As previously mentioned, the outer conductive layer 8 is electrically connected to ground 15 and the inner conductive layer 6 is connected to the electronic circuitry within the impact detection device 3 to provide an analogue signal input, representative of a change in capacitive coupling between the inner and outer conductive layers 6, 8 due to an impact being detected.

Figure 6:
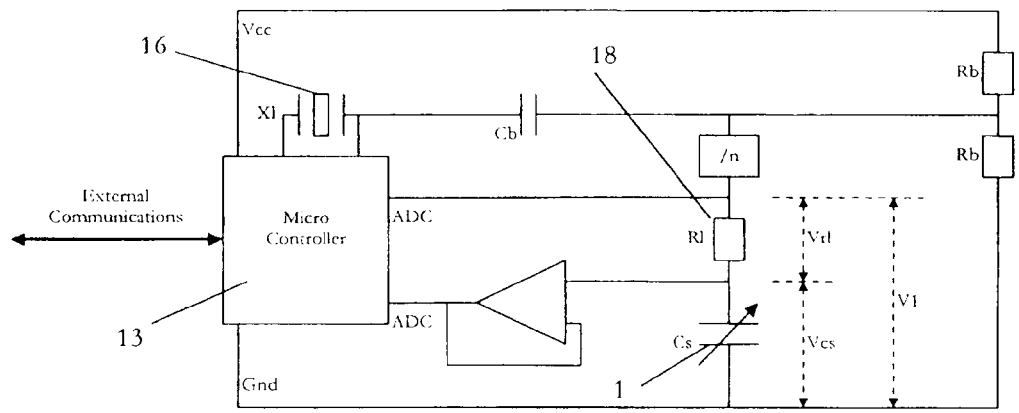
FIG. 6 is an electrical block diagram of the electronic sensing system of FIG. 1.

With reference to FIG. 6, all timing and clocking for the impact detection device 3 is derived from a crystal oscillator 16. The clocking signal is used to clock the processor 13 as well driving the capacitive fabric compression sensor(s) 1. Using this type of system clocking is also used to drive the analogue to digital converter (ADC) 19 and the signal peak to peak measuring algorithm derived from the processor 13 to be applied to the sensed input signal from the fabric compression sensor 6. This then provides a means synchronising the sensed impact signal 9 with a processor derived test signal in order to reduce processing power requirements and enable a low power processing solution to be used.

The analogue signal input is a low frequency signal and as such, the signal input amplifier 17 exhibits a low pass frequency response. The fabric compression sensor(s) 1 uses an AC signal generated by the impact sensing and processing device 3 and is driven within a controlled high output reference resistance ($R_{ref}$)18 of between 10 kOhms to 100 kOhms. The high output reference resistance 18 is equal in magnitude to the impedance of the capacitive fabric compression sensor (s) 1 at the drive signal impedance as:

$$R_{ref} \approx 1/(\omega C)$$

where $\omega$ is the AC signal frequency (rad/s) and C is the capacitance of the capacitive fabric compression sensor (F).

Figure 5:
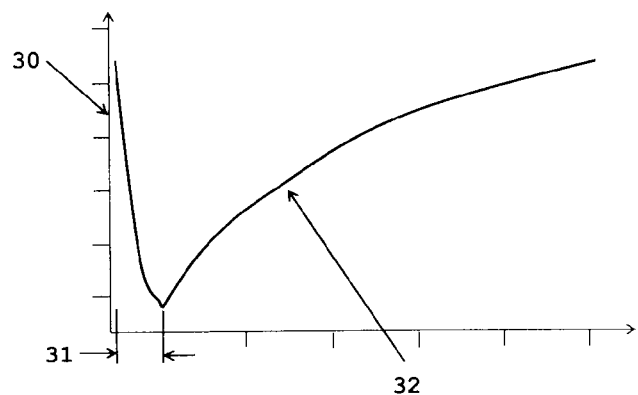
FIG. 5 is a graph of the impact detected by the electronic circuitry showing the back face velocity of the impact and subsequently bound.

The capacitive fabric compression sensor(s) 1 acts as a variable capacitor which has one terminal (outer layer 8) coupled to AC ground 15 and the other terminal (inner layer 6) attached to the high impedance resistor 18 to provide an analogue input drive signal. The AC ground 15 is the common mode point of the analogue input drive signal coupled through the resistor 18 within the impact sensing and processing device 3. The AC signal between the high impedance AC signal and the variable capacitor varies with the change in distance between the inner and outer conductive layers 6, 8 due to the deformation or compression of the non-conductive layer 7 caused by a detected impact. The AC signal amplitude is sampled by the microcontroller 13 within the impact detection device 3 to provide a sensed impact waveform. A typical output of the sensed impact waveform is shown in FIG. 5 whereby the velocity of the sensed impact rapidly decreases over time. This enables the initial back face velocity 30 to be determined, the time for the projectile 12 to come to rest 31 as well as the projectile rebound velocity 32 over time.

The impact detection device 3 is a low power device that is powered by batteries (not shown) and can be switched on using a manual switch (not shown) located on the device 3. Alternatively, the impact detection device 3 can be turned on automatically when the impact detection device 3 receives impact detection signals (when the capacitive coupling between the inner and outer conductive layers 6, 8 change), as a result of the non-conductive layer 7 being deformed or compressed due to an impact on the impact surface 2. Each of these "turn-on" configurations can be set at the time of manufacture or alternatively at a later stage using the third party system (not shown) and software to interface with the portable impact detection and sensing device 3.

The impact detection circuit uses an operational amplifier 17 with feedback to filter out any input noise signals whilst at the same time detecting a sensed impact signal from the conductive thread 9 attached to the inner conductive layer 6. This analogue input signal is then converted to a digital signal by the ADC 19 before being processed by the microcontroller 13. Impact sensing is performed by using the microcontroller crystal 16 to provide a sinewave reference source signal and driving one of the inner conductive fabric sensing layer 6 through a large resistance 18, such as 100 kOhms, whilst the outer conductive fabric sensing layer 8 is connected to the AC ground 15. Hence, the change in the capacitive coupling between the inner and outer conductive layers 6, 8 will alter the peak to peak sinewave signal input to the resistor 18. This sinewave signal provides an input to the microcontroller 13 to drive the microcontroller 13 and to enable synchronous sampling to be undertaken by the on-board ADC 19. Software residing within the microcontroller 13 performs peak to peak analysis on the received sinewave signal input to remove any DC signals which will occur due to initial garment fitting and background related noise.

The impact detection circuit can alternatively have an analogue signal input generated by a waveform source 26 such as a pulse width modulator (PWM). The analogue signal output from the signal source is to provide an AC reference source for driving one of the inner conductive fabric sensing layers 6 through high output reference resistance ($R_{ref}$)18 of between 10 kOhms to 100 kOhms whilst the outer conductive fabric sensing layer 8 is connected to the AC ground 15. Hence, the change in the capacitive coupling between the inner and outer conductive layers 6, 8 will alter the amplitude of the AC signal input into the amplifier 28. The signal is then passed through a rectifier 27 which converts the AC signal into a DC signal before being input into a low pass filter 25. The low pass filter 25 removes the effects of noise before the signal is input into the ADC 19 which samples the signal.

Once these signals and other sensor inputs are determined the change in capacitive coupling between the inner and outer conductive layers 6, 8 is used to calculate the voltage change between the two conductive layers 6, 8. Using this data, a number of software algorithms are used to determine the change in distance between the inner and outer conductive layers 6, 8 as a result of an impact being detected on the impact surface 2. The time taken from when an impact is first detected until the rate of change of capacitive coupling reaches zero is measured and stored in memory 14. The speed of impact is able to be determined by applying the formula:

$$\text{Speed} = \frac{\text{Change in distance between the inner and outer conductive layers}}{\text{Time period in which change occured}}$$

This data is either stored in memory 14 within the impact detection device 3 for transmission or communication via the communications port 20 to a third party system (not shown) at a later date. Alternatively, the data can transmitted, preferably wirelessly using a radio transmitting device (not shown), in real time to the third party device to be logged and analysed. This can be achieved by the user interfacing with the impact detection device 3 over communications link 20 using a software program residing in the third party system. Hence, the communications link can be provided by any form of communications means including but not limited to a wired connection, fibre optic, magnetic coupling, short or long range radio devices and a satellite link. The software system can activate the data download from the impact detection and processing device 3 to the third party system to enable the third party system to be used to format, view and analyse the sensed impact data.

Data Processing Circuitry

Figure 7:
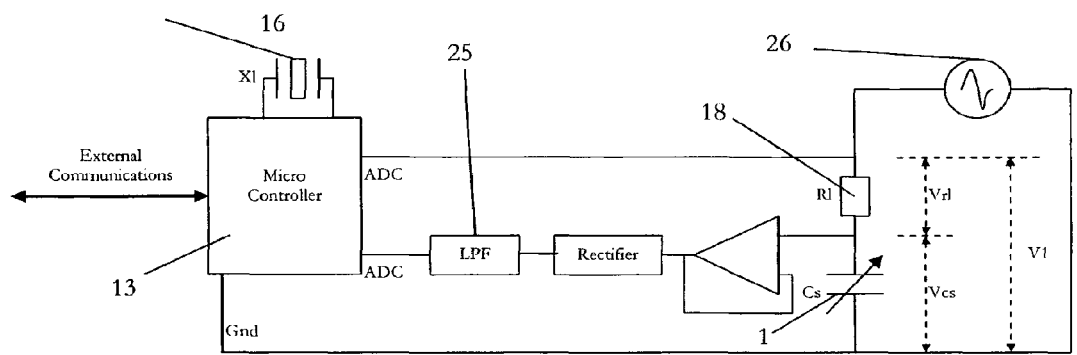
FIG. 7 is an alternative electrical block diagram of the electronic sensing system of FIG. 1.

FIGS. 4, 6 and 7 show block diagrams of the processing circuitry used to receive the sensed impact data from the signal inputs received from the fabric compression sensors 6, 8. The circuitry is driven by the software residing in the microcontroller 13 using time domain filtering techniques coupled with frequency locked loop computational algorithms to convert analogue sensed capacitive coupling variation signals into useable and meaningful digital formats for storage and/or output to a third party system. The third party system (not shown) subsequently converts the digital data to a numerical and graphic output display device for analysis and review by a professional for example.

Optional Features

Figure 8:
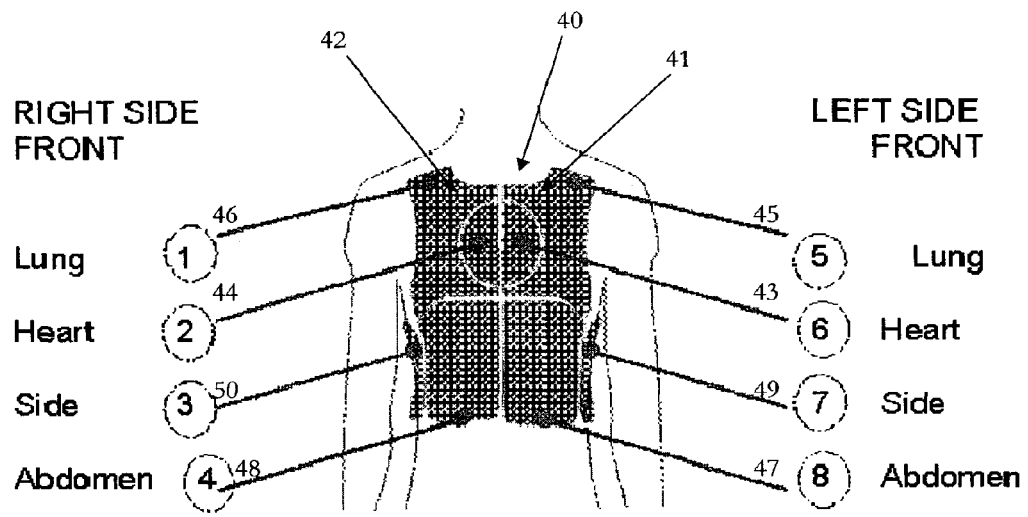
FIG. 8 is a diagram of sections of capacitive fabric compression sensors incorporated within an item of clothing.

The impact sensing and detection system of the present invention can be integrated with other sensing systems to capture a user's bio-mechanical data by monitoring the user's heart rate and respiratory rates for example. This would require additional sensors to monitor the user's vital signs to be attached to or incorporated within the user's clothing. Alternatively, the additional sensors and sensing electronics can be incorporated into or attached to a base layer of clothing such that the base layer of clothing lies against the user's skin. The addition of different sensor types would provide a more extensive determination to be made of the effects of the impact on a user. Furthermore, FIG. 8 shows a garment 40 worn by an individual that incorporates sections of compression sensors 1 can be attached to or incorporated within the garment 40 to detect and monitor impacts that may occur at or in close proximity to the user's vital signs as well as a number of physiological areas of interest. By way of example, the garment 40 has a left side 41 and a right side 42 and the compression sensors 1 have been located in positions such that the left side 41 of the garment 40 is a mirror image of the right side 42 of the garment 40. The compression sensors 1 have been positioned in a number of physiological areas of interest that may include, but are not limited to: the left and right heart area 43, 44, in close proximity to the mid-line of the garment 40; the left and right lung 45, 46; the left and right sides of the lower abdomen 47, 48; the left and right sides of the back (not seen); and the left and right side areas 49, 50. Furthermore, by incorporating one or more compression sensors 1 into a helmet to be worn by an individual, any impacts on the individual's head can be detected and monitored.

Examples of other sensors and features that can be monitored are as follows:

1. Movement measurement devices such as solid state accelerometers, solid state gyroscopes, mechanical vibration switches or piezo-electric movement detectors.
2. A temperature sensor to measure ambient and body temperature such as thermister or infra-red pickup semiconductor device.
3. Heart rate, respiratory rate monitoring using the capacitive compression sensors positioned in specific positions against the user's body and integrated with sensing electronics embedded within the impact detection device.
4. Pressure sensors to measure altitude using devices such as piezo bridges.
5. A flux gate compass for direction sensing.
6. An integration of the impact detection device with GPS and magnetic compass devices will enable the position and direction of the projectile 12 to be predicted thereby enabling other personnel to quickly respond to a potential threat situation.

The impact sensing and detection system of the present invention provides a portable lightweight device that can be used in a broad range of environments and conditions to provide information and feedback on the effects of a ballistic and non-ballistic type of impacts on an impact surface and ultimately, the residual effects such an impact may have on a user. The portability and usability of the device in a broad range of environments has been achieved by providing a small lightweight system that can be coupled with a processing system that is capable of discriminating between a sensed impact signal and residual background noise to provide a digital output indicative of a detected impact event.

What is claimed is:

1. An apparatus comprising:
   at least one capacitive compression sensor attached to a garment;
   said at least one capacitive compression sensor comprising:
      an inner layer of conductive material; and
      an outer layer of conductive material including an electrical isolation region; and
      a compressible non-conductive material between said inner layer and said outer layer of conductive material; and
   an impact detection device electrically connected to said at least one capacitive compression sensor via a conductor that traverses said electrical isolation region,
   said impact detection device comprising a processing circuit configured to process a change in a capacitance of said at least one capacitive compression sensor into a digital format representative of the impact.

2. The apparatus according to claim 1, wherein said outer layer of conductive material encloses said inner layer of conductive material.

3. The apparatus according to claim 1, wherein the garment is segmented into a plurality of zones and wherein each of the plurality of zones has one or more capacitive compression sensors attached to the garment and electrically connected to said impact detection device.

4. The apparatus according to claim 1, wherein said outer layer is coupled to an electrical ground of said impact detection device and said inner layer is electrically connected to a signal input of said impact detection device.

5. The apparatus according to claim 4, wherein said processing circuit is configured to sample an amplitude of the signal input to generate a waveform representative of the impact.

6. The apparatus according to claim 1, wherein said inner layer is formed from a stretchable and flexible conductive fabric.

7. The apparatus according to claim 1, wherein said inner layer is formed from a metallized cloth.

8. The apparatus according to claim 1, wherein said outer layer is formed from a stretchable conductive fabric.

9. The apparatus according to claim 1, wherein said outer layer is formed from a metallized cloth.

10. The apparatus according to claim 1, wherein said compressible non-conductive material is formed from a closed cell foam material.

11. A wearable garment to detect an impact, comprising:
a plurality of capacitive compression sensors;
each of said plurality of capacitive compression sensors comprising:
an inner layer of conductive material and an outer layer of conductive material; and
a compressible non-conductive material disposed between said inner and outer layers of conductive material;
an impact detection device electrically connected to each of said plurality of capacitive compression sensors;
said impact detection device comprising a processing circuit configured to process a change in a capacitance of each of the plurality of capacitive compression sensors into a digital format representative of an impact; and
wherein the garment is segmented into a plurality of zones and wherein each of the plurality of zones includes one or more of the plurality of capacitive compression sensors attached to the garment.

12. The garment according to claim 11, wherein said inner layer and said outer layer of each of the plurality of capacitive compression sensors is formed from a stretchable conductive material.

13. A method of forming a garment to detect an impact, comprising:

providing a compressible non-conductive material around an inner conductive layer;
enclosing said compressible non-conductive material and said inner conductive layer within an outer conductive layer such that said inner conductive layer, said compressible non-conductive material, and said outer conductive layer form a capacitive compression sensor;
attaching the capacitive compression sensor to a garment;
electrically connecting an impact detection device to said inner conductive layer of said capacitive compression sensor through an electrical isolation region of said outer conductive layer; and
wherein said impact detection device is configured to receive a signal input from said capacitive compression sensor to generate data representative of the impact.

14. The method according to claim 13, further comprising:
attaching a plurality of capacitive compression sensors to the garment; and
electrically connecting the plurality of capacitive compression sensors to the impact detection device.

15. The method according to claim 14, wherein said attaching comprises integrating the plurality of capacitive compression sensors into the garment.

16. The method according to claim 13, wherein said impact detection device is configured to generate a waveform representative of the impact.

17. The garment according to claim 11, wherein said inner conductive layer is formed from a stretchable conductive fabric.

18. The garment according to claim 11, wherein said inner conductive layer is formed from a metallized cloth.

19. The garment according to claim 11, wherein said outer conductive layer is formed from a stretchable conductive fabric.

20. The garment according to claim 11, wherein said compressible non-conductive material is formed from a closed cell foam material.

* * * * *